US006959741B1

(12) United States Patent
Fishel

(10) Patent No.: US 6,959,741 B1
(45) Date of Patent: Nov. 1, 2005

(54) METHOD AND APPARATUS FOR LOADING AND UNLOADING MATERIAL FROM A STORAGE MEDIUM

(75) Inventor: Michael D. Fishel, Whitestown, IN (US)

(73) Assignee: Texon L.P., Houston, TX (US)

(*) Notice: Subject to any disclaimer, the term of this patent is extended or adjusted under 35 U.S.C. 154(b) by 141 days.

(21) Appl. No.: 10/617,161

(22) Filed: Jul. 10, 2003

(51) Int. Cl.[7] .......... B65B 1/04
(52) U.S. Cl. .......... 141/231; 222/608
(58) Field of Search .......... 141/231, 65, 66, 141/98, 67; 222/608; 280/839, 836, 837, 280/838; 137/351, 899.4, 355.16–355.19

(56) References Cited

U.S. PATENT DOCUMENTS 2,487,863 A 11/1949 Garretson
4,174,741 A 11/1979 Parsons et al.
4,225,059 A * 9/1980 Kappos .......... 222/146.6
4,264,243 A 4/1981 Bentzen-Bilkvist
4,389,314 A * 6/1983 Petretti .......... 210/241
4,886,282 A * 12/1989 Wilkinson et al. .......... 280/4
5,941,081 A 8/1999 Burgener
6,014,995 A * 1/2000 Agnew .......... 141/231
6,079,461 A * 6/2000 Fisher et al. .......... 141/231
6,168,054 B1 * 1/2001 Shelton, Jr. .......... 222/608
6,266,974 B1 * 7/2001 Craft .......... 62/457.9
6,296,028 B1 * 10/2001 Oakland .......... 141/231
6,382,272 B1 * 5/2002 Dahlin et al. .......... 141/231
6,637,479 B1 10/2003 Eide et al.

* cited by examiner

*Primary Examiner*—Steven O. Douglas
(74) *Attorney, Agent, or Firm*—King & Spalding LLP

(57) ABSTRACT

A portable material transfer unit allows for the loading and unloading of a material from a storage medium. The portable material transfer unit is a self-contained unit that can be moved to any location accessible by motorized vehicle without the need for pneumatic or electrical hook-ups. Thus, the portable material transfer unit can be used to load or unload material from railroad tank cars in temporary locations not generally considered to be loading or unloading stations. Also, the portable material transfer unit can transfer material from railroad tank cars without the need for repositioning of the cars by a locomotive. Furthermore, the portable material transfer unit can quickly and easily be converted from an unloading position to a transporting position so that the portable material transfer unit can be towed on any highway or public access road.

70 Claims, 7 Drawing Sheets

METHOD AND APPARATUS FOR LOADING AND UNLOADING MATERIAL FROM A STORAGE MEDIUM

FIELD OF THE INVENTION

The present invention relates to an improved method and apparatus for transferring materials between storage mediums. More particularly, the present invention relates to a self-contained portable apparatus capable of being moved to the location of a railroad tank car for unloading material from the railroad tank car into another liquid storage medium.

BACKGROUND OF THE INVENTION

The process of loading and unloading material from railroad tank cars has typically been accomplished at a rail yard or terminal. The need for a rail yard or terminal to load and unload railroad tank cars is both costly and time consuming. First, the construction of a rail yard or terminal can be both expensive and time consuming. Problems associated with developing a rail yard or terminal include finding a suitable place to build the yard or terminal. To find a suitable place, an entity must first find a significant amount of land to construct the terminal in an area zoned to allow for such construction. Furthermore, the zoned areas may not be close to an area the entity wishes to deliver the tank cars, thereby increasing transportation costs after unloading. Next, the entity must successfully maneuver through the permit process, mindful that neighborhood associations in the surrounding area and government agencies may be against the development of a railroad terminal. Then, the entity must locate a financing source to fund the construction of the yard or terminal. Construction costs include the laying of track; infrastructure improvements, including buildings, gangways, and material storage facilities; and the lease or purchase of locomotives to maneuver the railroad tank cars into a position where they can be unloaded. Finally, a great deal of time must be taken to construct the rail yard or terminal with no guarantee how long the facility will be financially viable.

Second, a typical rail yard or terminal can take a great amount of time to load or unload multiple rail tank cars. Even if the terminal has multiple loading and unloading stations, these stations are typically fixed in place. Thus, when a first railroad tank car is finished being loaded or unloaded, a locomotive must be used to move the first railroad tank car out of the station, retrieve a second railroad tank car from another area, and move the second railroad tank car into the station. The amount of time can be further exacerbated by the fact that rail cars are not always delivered to a terminal in an order that allows for the efficient carrying out of the loading and unloading process. The need to maneuver rail cars also requires a greater amount of space at the terminal, thereby further increasing the cost.

Third, the demand for some types of material is seasonal and dependent on the area of the country. Thus, while a company may find a need to deliver a high quantity of cars during some months of the year, the same company may need to make few if any deliveries in other months. Such fluctuations can keep the building of a rail yard of terminal from being cost effective. Furthermore, the ability to load or unload a railroad tank car quickly and efficiently in close proximity to the material's final destination would reduce overall transportation costs and increase profitability.

Recently, parties who transfer liquid from railroad tank cars have been allowed to transfer the liquid directly from the tank car to another mobile storage medium, such as a tanker truck. Thus, unloading operations are no longer required to first transfer the liquid from the railroad tank car to a large, stationary holding tank and then transfer it to a second mobile storage medium. The ability to directly transfer from one mobile container to another has both eliminated the need for large scale holding tanks and the fixed unloading stations build in their vicinity. Now, as long as a second mobile storage medium can be positioned near the railroad tank car, any place can be a loading or unloading site, as long as the equipment necessary for transferring the liquid can also be maneuvered into the same general area as the railroad tank car and the second mobile storage medium.

Some entities have attempted to eliminate the need for a rail yard or terminal by developing a conventional mobile platform to hold equipment necessary for unloading a railroad tank car. To unload a railroad tank car using a conventional mobile platform, a user could move the mobile platform into a position near the railroad tank car. The equipment necessary to unload the railroad tank car could then be unloaded off of a transport platform and assembled on the conventional mobile platform. Once the unloading process is completed, the equipment can be dismantled and loaded back onto the transport platform and the conventional mobile platform can be towed away.

While the mobile platform may be an improvement both in cost and time consumed in unloading railroad tank cars it still has several drawbacks. First, the mobile platform usually requires A/C power to operate. This means that the conventional mobile platform can never be used in rural areas devoid of electrical hook-ups. Second, if a user wants to take the mobile platform on a road or highway, the unloading equipment usually is dismantled from the mobile platform and placed on a transport platform attached to a vehicle for transport. Thus, extra time can be consumed in building and dismantling the mobile platform at each unloading site. Therefore, the mobile platform cannot be characterized as completely portable.

In view of the foregoing, there is a need for a portable liquid material transfer unit that can access rail cars of differing heights, can be moved to any area accessible by motorized vehicles, and can quickly and easily be prepared for transport on a road or highway after use.

SUMMARY OF THE INVENTION

The present invention overcomes the deficiencies of conventional railroad material transfer stations and newer mobile material transfer platforms by providing a completely portable material transfer unit that can be moved to any area accessible by motorized vehicles. The material transfer unit is characterized as portable because the material transfer unit typically does not require A/C power to operate, but instead can derive its power to transfer material from the rail tank cars from a gasoline or diesel engine that can be supplied from a fuel tank on the material transfer unit. Furthermore, re-positioning of a tank car access platform, that can be slidably adjusted and vertically adjusted, is all that is typically needed to make the material transfer unit ready for the highway.

For one aspect of the present invention, a portable material transfer unit can include a mounting platform. The mounting platform can be metallic and provide sufficient support for attaching additional components to the platform. An axle and multiple wheels can be attached to the mounting platform to provide a mechanism for moving the mounting platform from one position to the next.

An access platform can be attached to the mounting platform. The access platform typically resembles a stairway that can have a gangway attached to the top of the stairs. The height of the access platform can be fixed or adjustable. For access platforms having adjustable heights, the height of the access platform can be adjusted to facilitate the attachment of material transfer piping and/or flexible hosing to storage mediums having a range of heights. The access platform height can be adjusted through the use of pneumatic, hydraulic, electrical, or mechanical power. In one exemplary embodiment, the access platform is a tank car access platform.

A compressor can be placed on the mounting platform. The compressor typically generates a pressure differential between a first and a second storage medium that can assist the material in flowing from the first to the second storage medium. The compressor can also provide pneumatic pressure to the access platform to assist in the adjustability of the access platform. Additionally, a set of piping or hoses can be placed on the mounting platform. The piping or hoses can provide a conduit through which material can pass from one storage medium to another. Furthermore, the set of piping or hoses can be attached to the storage mediums and the compressor to generate a pressure differential, that can assist the flow of material between storage mediums.

For another aspect of the present invention, a method for employing the portable material transfer unit can include transporting the portable material transfer unit to a first location. The portable material transfer unit can be transported using a car, truck, or other type of motorized vehicle. Once at the first location, the portable material transfer unit can transfer material from one storage medium to another. The portable material transfer unit can be transported to a second location. The second location is typically different from the first location. At the second location, the portable material transfer unit can transfer material from one storage medium to another. The storage mediums can be railroad tank cars, tanker trucks, or fixed storage tanks.

Another aspect of the present invention includes transporting the portable material transfer unit adjacent to a first storage medium. The portable material transfer unit can be employed to transfer material to or from the first storage medium in a transfer operation. Once the transfer operation is completed, the portable material transfer unit can be transported adjacent to a second storage medium for another transfer operation. In one exemplary embodiment, the first and second storage mediums are at the same location, such as a rail yard or terminal. The unit can be transported by towing the unit with an automobile, truck, or other motorized vehicle.

For yet another aspect of the present invention, the portable material transfer unit can be employed to evacuate material and vapor from a storage medium to allow for periodic repairs and maintenance of the storage medium.

Another aspect of the present invention includes the ability of reversing the pressure differential flow generated by the compressor on the portable material transfer unit after the material has been transferred. Reversing the pressure differential flow can allow for the retrieval of material vapor that remain in the storage medium. The retrieval of the material vapor can result in a more efficient retrieval of product from the storage medium.

For another aspect of the present invention, the portable material transfer unit can be transported to a remote location to evacuate a storage medium under an emergency situation. The emergency situations can include a rail tank car that has derailed or an overturned tanker truck. Use of the portable material transfer unit during the emergency situation would not require placing the storage medium in its upright position prior to transferring the material. Since the portable material transfer unit employs a pressure differential to transfer materials, material can be transferred from a storage medium even if the storage medium is laying on its side.

The aspects of the present invention may be more clearly understood and appreciated from a review of the following detailed description of the exemplary embodiments and by reference to the drawings and claims.

BRIEF DESCRIPTION OF DRAWINGS

For a more complete understanding of the present invention and the advantages thereof, reference is now made to the following description in conjunction with the accompanying drawings in that.

DETAILED DESCRIPTION OF THE EXEMPLARY EMBODIMENTS

Figure 1:
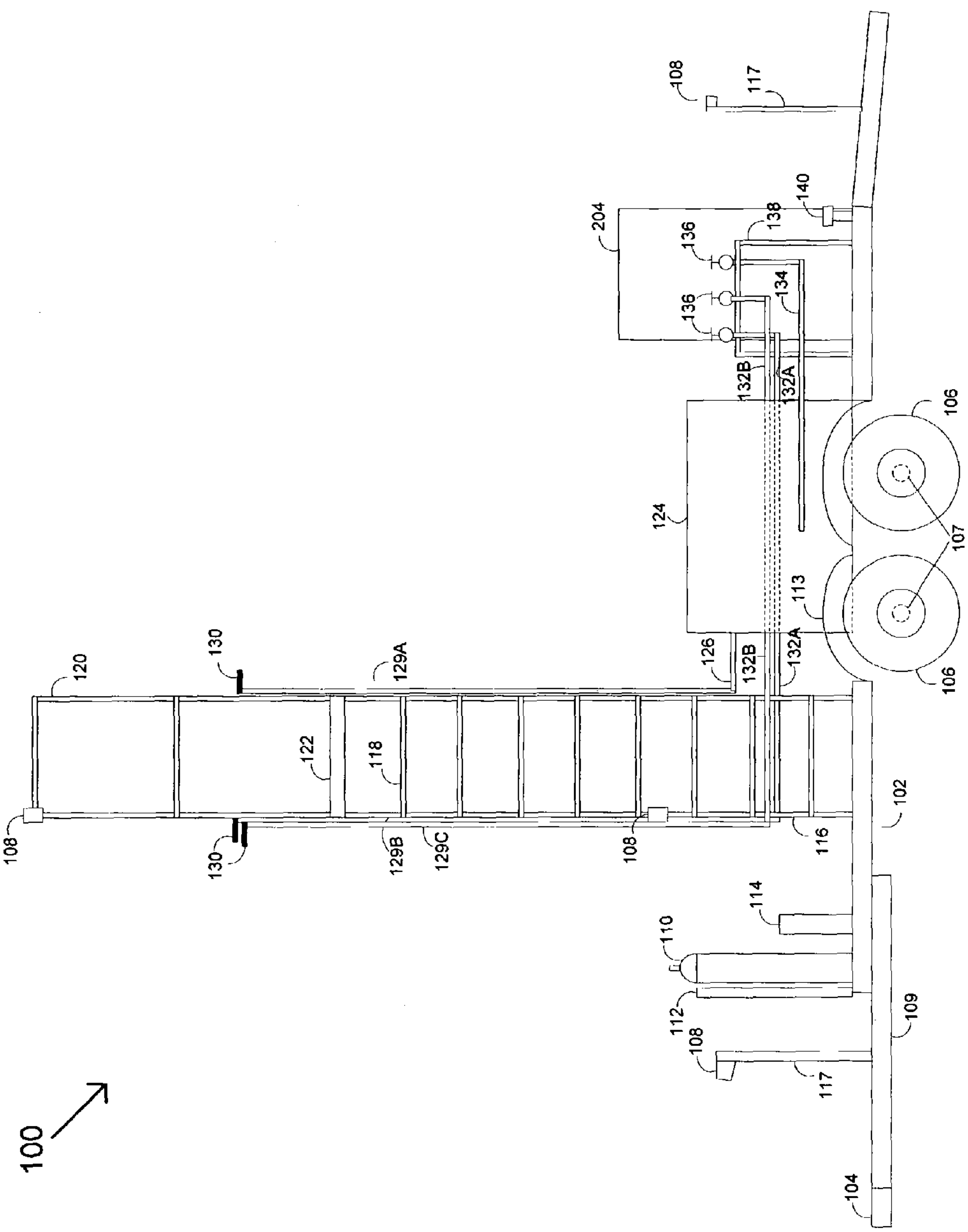
FIG. 1 depicts a side view of a portable material transfer unit in accordance with an exemplary embodiment of the present invention.
Figure 2:
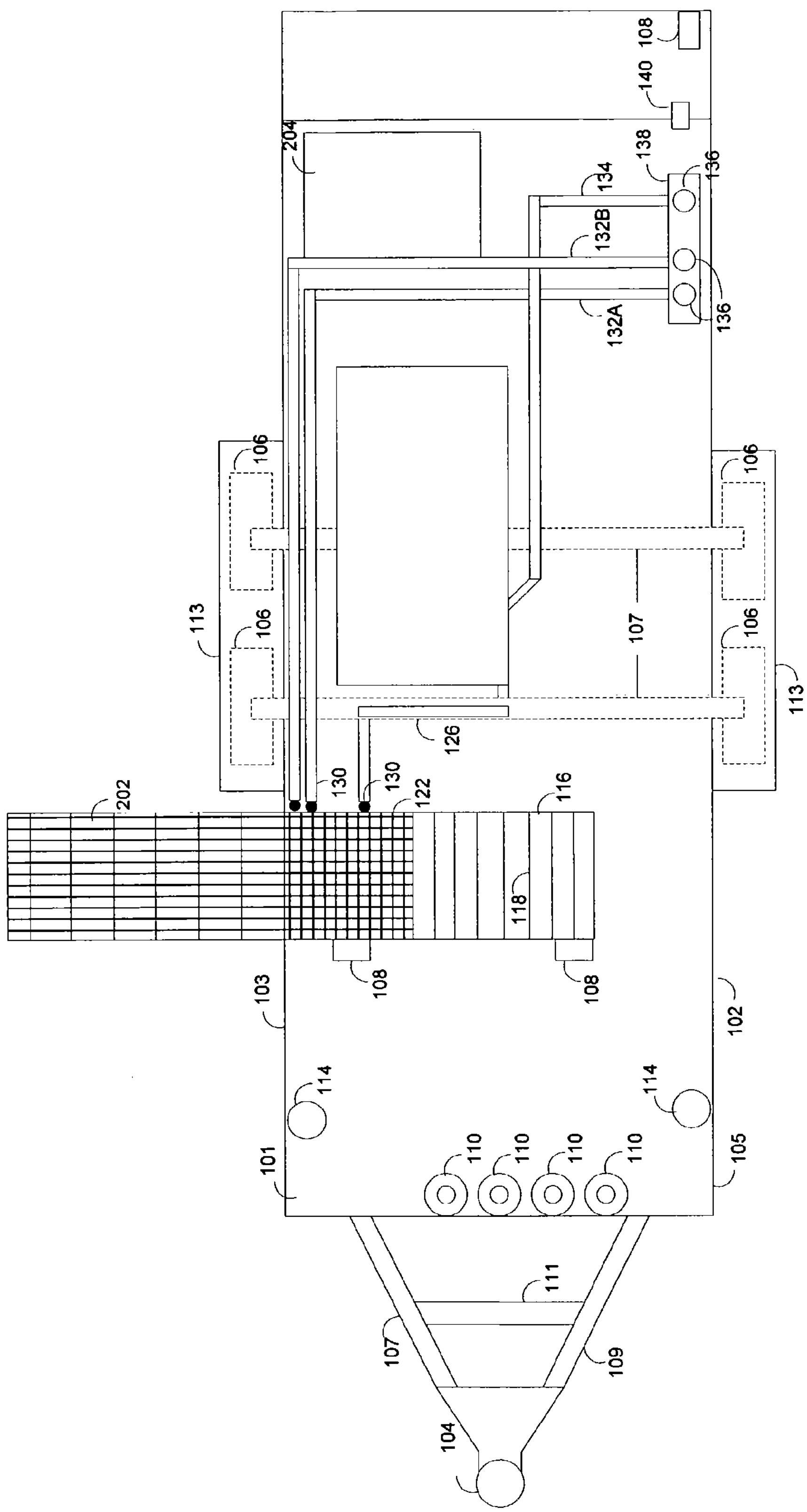
FIG. 2 depicts an overhead view of the portable material transfer unit in accordance with an exemplary embodiment of the present invention.

The present invention supports the transfer of materials from a railroad tank car through the use of a portable apparatus as can be more readily understood by reference to the representative apparatus illustrated in FIGS. 1 and 2. FIG. 1 is a side view of a portable material transfer unit ("material transfer unit") 100, in accordance with an exemplary embodiment of the present invention. FIG. 2 is an overhead view of the mobile material transfer unit 100 in accordance with an exemplary embodiment of the present invention. The material transfer unit 100 can include a mounting platform 102 upon that other parts of the material transfer unit 100 are affixed. In one exemplary embodiment of the present invention, the mounting platform 102 is formed by a first set of two horizontal parallel members 103 attached orthogonally to the ends of a second set of two horizontal parallel members 105. A top plate 101 can comprise a layer of diamond-plate sheet metal that is attached to the top of the first and second set of two parallel horizontal members 103 and 105 to form the mounting platform 102. The top plate 101 can be attached to the first and second set of two parallel horizontal members 103 and 105 with fasteners, such as nuts, bolts, or screws, or welding.

A trailer hitch 104 is attached to the mounting platform 102 by two converging members 107, 109, each converging member 107, 109 being attached at one end to the bottom side of the mounting platform 102 and converging at a point wherein the trailer hitch 104 and the converging members 107, 109 are attached together. The converging members 107, 109 typically comprise square metal tubing attached to the mounting platform 102 and the trailer hitch 104. The converging members 107, 109 can be fastened to the mounting platform 102 and the trailer hitch 104 by fasteners or welds. A third member 111 can attach the converging members 107, 109 approximately at the midpoint between the trailer hitch 104 and the mounting platform 102. The third member 111 typically connects the converging members 107, 109 in a line perpendicular to a shortest line drawn from the trailer hitch 104 to the mounting platform 102. The third member 111 provides improved stability and support to the converging members 107, 109 and can be attached to the converging members 107, 109 via fasteners or welds.

Wheels 106 are attached to an axle 107 and further attached to the bottom side of the mounting platform 102. The wheels 106 are positioned to rotate in a direction parallel to the second set of parallel members 105 and can be positioned at a point approximately equidistant from the endpoints of the second set of parallel members 105. Furthermore, the wheels 106 are positioned outside of the mounting platform 102 and can be covered by fenders 113. The wheels allow the mounting platform 102 to be transportable on roads or highways of any kind, including dirt roads.

Equipment attached to the mounting platform 102 comprises emergency shutdown activators 108; nitrogen canisters 110; fire extinguishers 114; a tank car access platform 116; a compressor 124; piping or hoses 126, 132A, 132B, 134; piping connectors 130, 136; a grounding system 140; mounting brackets 112, 138; and a fuel tank 204. In one exemplary embodiment, piping can include metal and plastic piping, hoses, tubing and flexible hoses.

Emergency shutdown activators 108 provide a user the ability to immediately stop the transfer of fluid from a tank car to a tank or tanker truck. Emergency shutdown activators 108 are placed on the mounting platform 102 and the tank car access platform 116. The emergency shutdown activators 108 attached to the tank car access platform 116 are positioned in a way such that the emergency shutdown activators 108 can be depressed by a user either standing on the mounting platform 102 or a gangway 202. The emergency shutdown activators 108 can be mounted to the tank car access platform 116 with fasteners that may include nuts and bolts. The emergency shutdown activators 108 positioned on the mounting platform 102 and third member 111 can be mounted to a vertical member 117 with fasteners that may include nuts and bolts. The vertical member 117 is attached to the mounting platform 102 and the third member 111 through the use of welding or fasteners. The vertical member 117 typically comprises steel square tubing. The emergency shutdown activators 108 comprise safety valves that activate various shutdown valves on the unit 100. In one exemplary embodiment the emergency shutdown activator 108 comprises a push button valve that activates an emergency shutdown system.

Nitrogen canisters 110 can be placed at the front end of the mounting platform 102. The nitrogen canisters are positioned next to a mounting bracket 112 and held in place against the mounting bracket 112 using strapping or metal brackets with fasteners, such as nuts and bolts (not shown). The mounting bracket 112 can comprise two pieces of steel square tubing, running in the vertical direction, welded to a horizontal piece of steel square tubing at the top of the two vertical pieces. The nitrogen canisters 110 are filled with nitrogen gas, that assists both in the operation of the safety equipment on the mounting platform 102 and in shutting down the pipe loading system. Multiple fire extinguishers 114 are fastened to the mounting platform 102 with a mounting bracket (not shown) and fasteners that may include nuts and bolts.

The tank car access platform 116 comprises multiple stairs 118, a landing 122, a gangway 202, and guard rails 120. The tank car access platform 116 provides a user with the ability to access the top of a railroad tank car by walking up the stairs 118 and onto the landing 122. The user then walks onto the gangway 202, that extends beyond the mounting platform 102 in a direction perpendicular to the rolling direction of the wheels 106. Furthermore, the tank access platform 116 can be of a type capable of being adjusted to a greater or lesser height depending on the position of the mounting platform 102 in relation to a rail tank car and the height of the rail tank car. Height adjustability allows a user to safely and easily access the tank car valves from the gangway 202. The tank access platform 116 can be attached to the mounting platform 102 with multiple mounting plates and fasteners (not shown). In one exemplary embodiment, the tank access platform 116 comprises a BALLYMORE adjustable, hydraulic stair and gangway unit.

A compressor 124 is attached to the mounting platform 102 with mounting plates and fasteners (not shown). The compressor 124 can include an engine or motor and a clutch assembly. A first pipe or hose 134 runs from a breakaway header 138 into the compressor 124. A second pipe or hose 126 runs from the compressor 124 to a first flexible hose 129A that runs up the side of the tank car access platform 116 and is capped with an attachment valve 130 that can be attached to a emergency shutdown valve (not shown). In one exemplary embodiment, the compressor 124 comprises a CORKEN Model 691 LPG Vapor Compressor; a DEUTZ 47 horsepower, 3 cylinder, air cooled engine; and a TECHNODRIVE Model BD130/50 clutch. The first and second hose or piping 134, 126 typically comprise two-inch diameter hoses or piping. In one exemplary embodiment, all pipe-to-pipe connections, pipe-to-flexible hose connections, pipe-to-breakaway header 138 connections, and pipe-to-rail car, tanker truck, or storage tank connections include swivels that allow for the rotational movement of the pipe or flexible hose into position to facilitate a connection.

A third hose or piping 132A runs from the breakaway header 138 to a second flexible hose 129B, that is capped with an attachment valve 130. The third hose or piping 132A and the second flexible hose 129B can comprise two-inch diameter hoses or piping that can support high pressure, liquefied petroleum. A fourth hose or piping 132B runs from the breakaway header 138 to a third flexible hose 129C, that can be capped with an attachment valve 130. The fourth hose or piping 132B and the third flexible hose 129C can comprise two-inch diameter hoses or piping that can support high pressure, liquefied petroleum. The breakaway header 138 comprises a first and second piece of steel flatbar extending vertically from the mounting platform 102 and a third piece of steel flatbar attached orthogonally to the top of the first and second piece of steel flatbar and laid in a direction parallel to the rolling direction of the wheels 106. The breakaway header 138 can be attached to the mounting platform 102 through the use of welding or fasteners. Multiple piping connectors 136 can include both standard shutdown valves and emergency shutdown valves. The multiple piping connectors 136 are attached to the break-away header 138 and accept connection of the first, third, and fourth pipes or hoses 134, 132A, and 132B. The piping connectors 136 typically contain a valve for starting and stopping the flow of vapor or liquid. A fuel tank 204 is attached to the mounting platform 102 through the use of mounting brackets and fasteners (not shown). The fuel tank 204 provides the ability to store fuel for use when the portable material transfer unit 100 is located in an area that does not have access to other fuel or electrical sources to power the compressor 124. In one exemplary embodiment, the fuel tank 204 comprises a fifty-five gallon fuel storage tank. Furthermore, the fuel tank 204 can be connected to the compressor 124 so that fuel is directly supplied to satisfy the compressor's 124 fuel needs.

The mobile material transfer unit 100 can be maneuvered near a rail tank car at a first location, such as a rail yard, terminal, or railroad spur. The mobile material transfer unit 100 can transfer the material from the rail tank car to another storage medium, such as a tanker truck. In one exemplary embodiment, the material is liquefied petroleum gas. Once transfer of the exemplary liquefied petroleum gas ("LPG") is completed, the compressor 124 can be reversed so that the LPG vapor can be removed from the rail tank car to the tanker truck. The retrieval of the vapor from the rail tank car results in additional material being removed thereby increasing the efficiency of the unit 100. The reversal of flow to capture the vapor from the rail tank car can be easily accomplished by reversing the direction of the compressor 124. Once all material, which can include vapor, has been removed from the rail tank car, the mobile material transfer unit 100 can be maneuvered to another rail tank car at the current location. This process can continue until all material at the first location, that an operator desires to unload from rail tank cars, is transferred. Completion of the transfer operation does not require that all the material be removed from the rail tank car. Additionally, the mobile material transfer unit 100 can be transported to second, third, and fourth locations where the unit can transfer material from other rail tank cars. The mobile material transfer unit 100 can be transported to the second, third, and fourth locations via a highway, public access road, or dirt road. During the transfer operation, the material can be transferred to another storage medium, such as a tanker truck, storage tank, or another rail tank car. It will be obvious to those of ordinary skill in the art that the process of transferring material using the mobile material transfer unit 100 is not limited by the number of transfer operations occurring at a single location or the number of locations to which the unit 100 is maneuvered for a transfer operation. Furthermore, it will be obvious to those of ordinary skill in the art that the process of transferring material using the mobile material transfer unit 100 is not limited by the distance between locations since the mobile material transfer unit 100 can be transported over any surface accessible by motorized vehicle.

Figure 3:
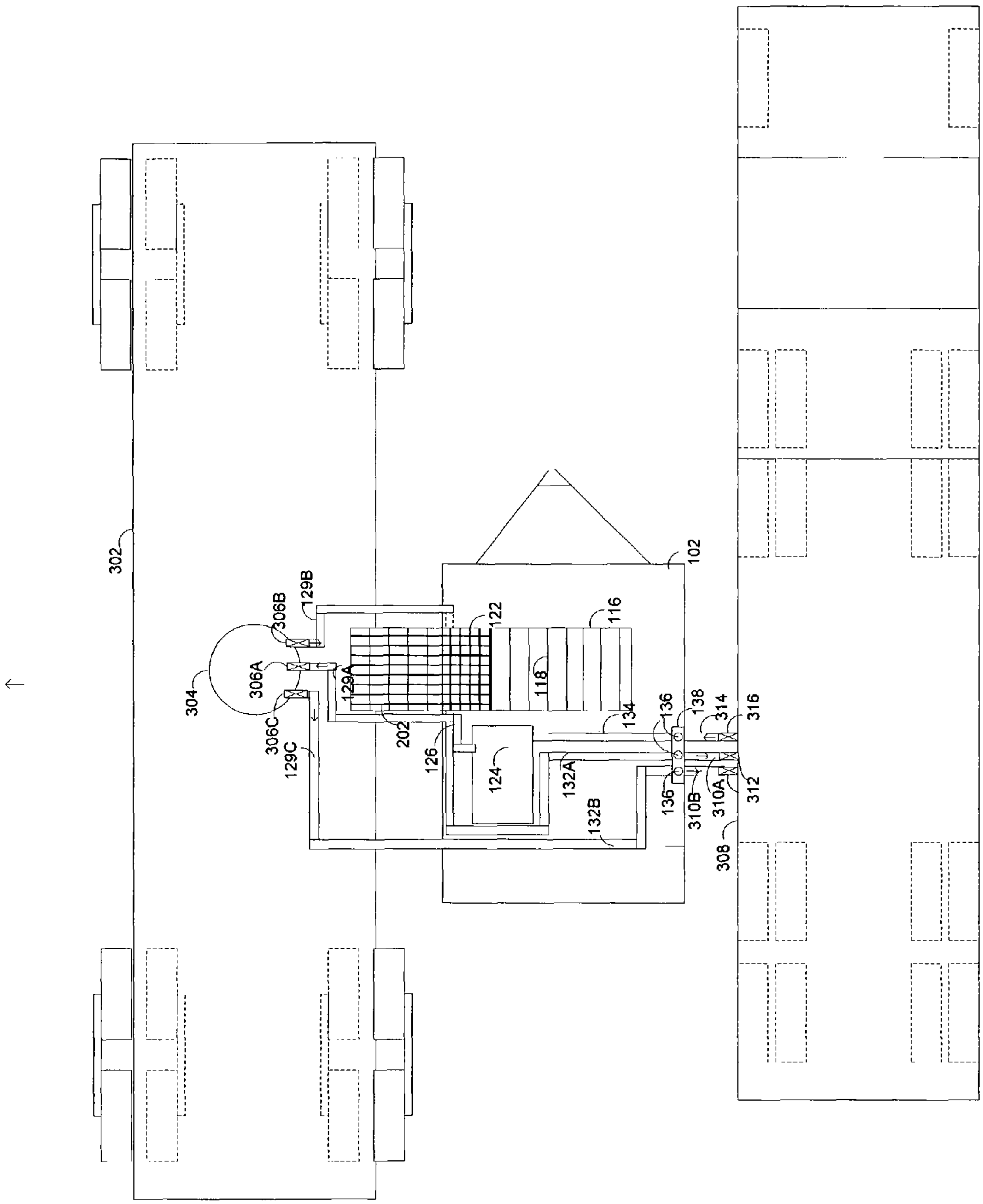
FIG. 3 depicts the unloading of a material from a rail car to a tanker truck using the portable material transfer unit in accordance with an exemplary embodiment of the present invention.

FIG. 3 depicts the transfer of a material from a rail tank car 302 to a tanker truck 308 using the portable material transfer unit 100 in accordance with an exemplary embodiment of the present invention. In the exemplary embodiment, the material transfer unit 100 is placed between the rail tank car 302 and the tanker truck 308, but the placement of the material transfer unit 100 is a function of the position of the valves on the rail tank car 302 and the length of the pipes or hoses 310A, 310B, and 314 running from the tanker truck 308 to the piping connectors 136. For example, in another exemplary embodiment, the rail tank car 302 could be in between the material transfer unit 100 and the tanker truck 308 if enough piping or hose 310A, 310B, and 314 was available to run from the tanker truck 308 to the piping connectors 136.

The material transfer unit 100 is moved to a position alongside the rail tank car 302 so that the gangway 202 can access the tank car valves 306A, 306B, and 306C. The first flexible hose 129A, that runs to the compressor 124, is attached to a first rail tank car valve 306A using piping connector 130. A second and third flexible hose 129B and 129C are attached to a second and third rail tank car valve 306B and 306C respectively, using piping connector 130. A fourth flexible hose 310A is attached at one end to the third pipe or hose 132A using piping connector 136 and at the other end to a tanker truck valve 312. A fifth flexible hose 310B is attached at one end to the fourth pipe or hose 132B using piping connector 136 and at the other end to a tanker truck valve 312. A sixth flexible hose 314 is attached at one end to the first pipe or hose 134 using piping connector 136 and at the other end to a tanker truck valve 316. A user turns on the compressor 124 that takes vapor from the tanker truck 308 through the hose 314 and first pipe or hose 134 to the compressor 124. The compressor 124 compresses the retrieved vapor and sends the it to the rail tank car 302 through the second pipe or hose 126 and first flexible hose 129A. The vapor added to the rail tank car 302 increases the pressure inside the rail tank car. A pressure differential is created between the rail tank car 302 and the tanker truck 308. The pressure differential causes the material in the rail tank car 302 to flow through the second and third flexible hoses 129B and 129C to the third and fourth piping or hoses 132A and 132B respectively, through the fourth and fifth piping or hoses 310A and 310B, and into the tanker truck 308. Once the material has been removed, the compressor 124 can be reversed to pull the vapor from the rail tank car 302. Reversing the compressor 124 and removing the vapor eliminates the need to burn off the vapor and increases the efficiency of the amount of material removed from the rail tank car 302. In one exemplary embodiment, the material being transferred is liquefied petroleum gas. The mobile material transfer unit can also transfer other liquid materials including propane, butane, and anhydrous ammonia. Those skilled in the art will recognize that the transfer of some types of liquid material will require the use of specific types of metal piping, hoses, and fittings. Those skilled in the art will also recognize that the present invention may be implemented between any two material storage mediums to transfer material from one storage medium to another. Furthermore, those skilled in the art will recognize that a multitude of liquid materials can be transferred using the mobile material transfer unit 100

Figure 4A:
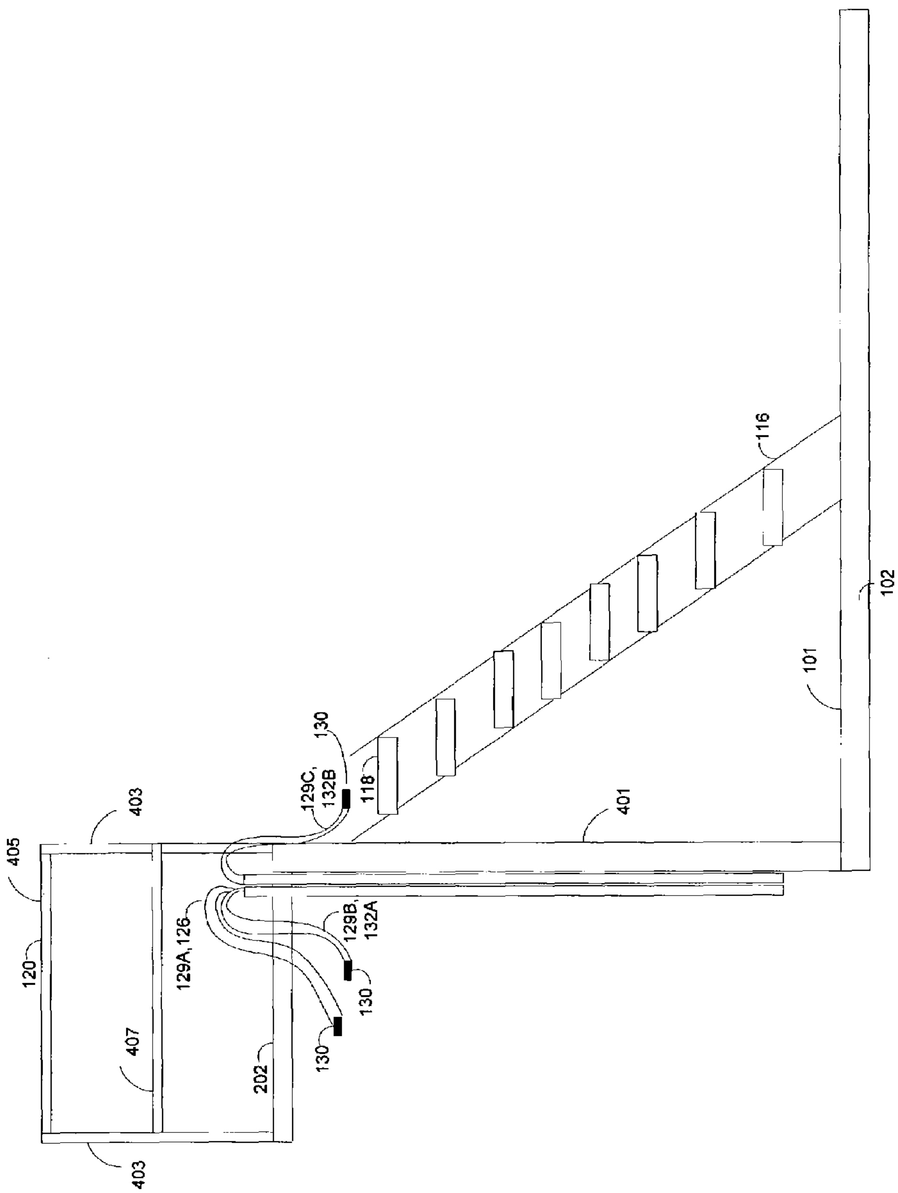
FIGS. 4A and 4B depict a side view of a telescoping platform and access of the portable material transfer unit in accordance with an exemplary embodiment of the present invention.
Figure 4B:
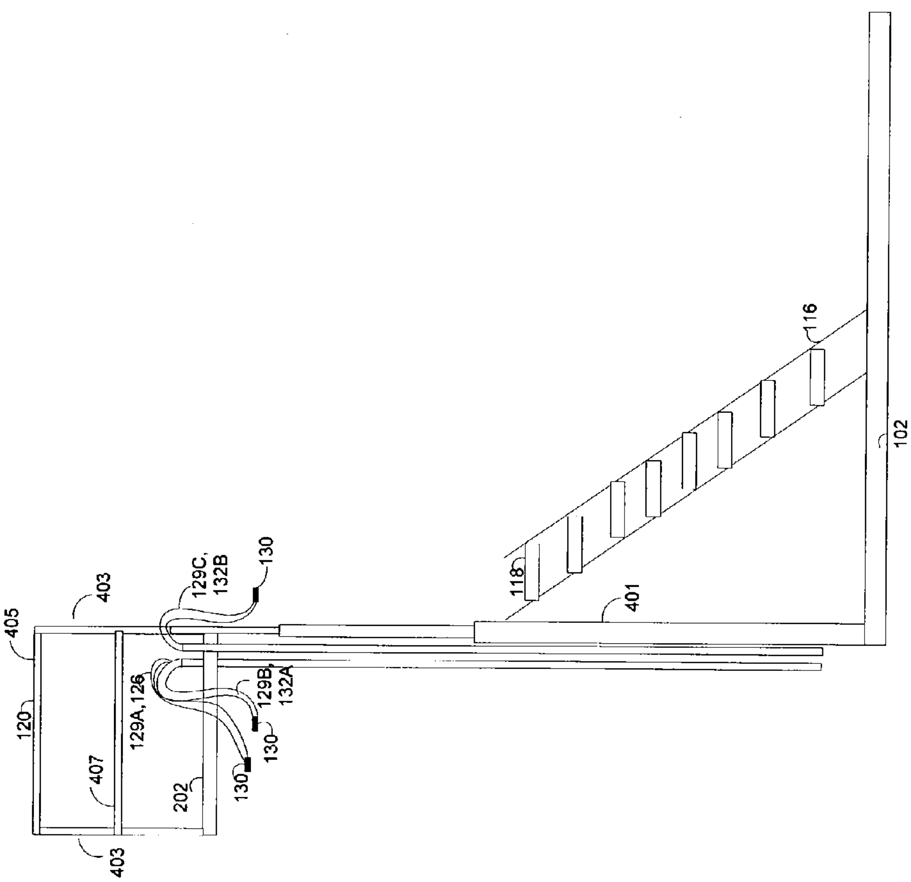

FIGS. 4A and 4B depict a side view of an exemplary telescoping platform and access 116 for the portable material transfer unit 100 in accordance with an exemplary embodiment of the present invention. FIG. 4A shows the tank car access platform 116 in a lowered position where a user can access the tank car access platform 116 from the mounting platform 102 by walking up the stairway 118 to the landing platform 122 and the gangway 202. The stairway 118 can be attached to a tank car access platform frame 401 by welding or the use of fasteners that may include nuts and bolts. FIG. 4B depicts the tank car access platform 116 in the raised position. The raised position allows the user to access the top of a rail tank car that can be at a height greater than the rail car access platform 116 in the lowered position. Hydraulic pressure can be used to raise and lower the tank car access platform 116 to a height that allows a user the best access to the top of a rail tank car 302. The tank car access platform 116, in the unloading position, is attached to the mounting platform 102 with mounting plates and fasteners that may include nuts and bolts (not shown).

Guard rail 120 is formed by four vertical parallel members 403 attached orthogonally to the gangway 202. A first set of three horizontal parallel members 405 are attached orthogonally to the upper ends of the four vertical parallel members 403. The first set of three horizontal parallel members 405 can also be attached to each other orthogonally at their endpoints. A second set of three horizontal parallel members 407 can be attached to the four vertical parallel members 403 orthogonally at the approximate vertical midpoint of the four vertical members 403. The guard rail 120 assists in preventing a user from falling off the gangway 202. The four vertical parallel members 403, first set of three horizontal parallel members 405, and second set of three horizontal parallel members 407 can be attached through the use of welding or with fasteners.

The second pipe 126, third pipe 132A, and fourth pipe 132B or hoses run parallel to and alongside the tank car access platform frame 401 to flexible hoses 129A, 129B, and 129C respectively. Each of the flexible hoses 129A, 129B, and 129C can contain an attachment valve 130 and an emergency shutdown valve. The use of the flexible hoses 129A, 129B, and 129C allows for the change in the height of the tank car access platform 116. Furthermore, flexible hoses 129A, 129B, and 129C enable a user to attach the flexible hoses 129A, 129B, and 129C to a rail tank car in the event that the portable material transfer unit 100 is not perfectly aligned with the rail tank car 302. In the tank car access platform unloading position, as shown in FIGS. 4A and 4B, the gangway 202 extends outside the perimeter of the mounting platform 102, thereby allowing a user to access the top portion of the rail tank car 302.

Figure 5:
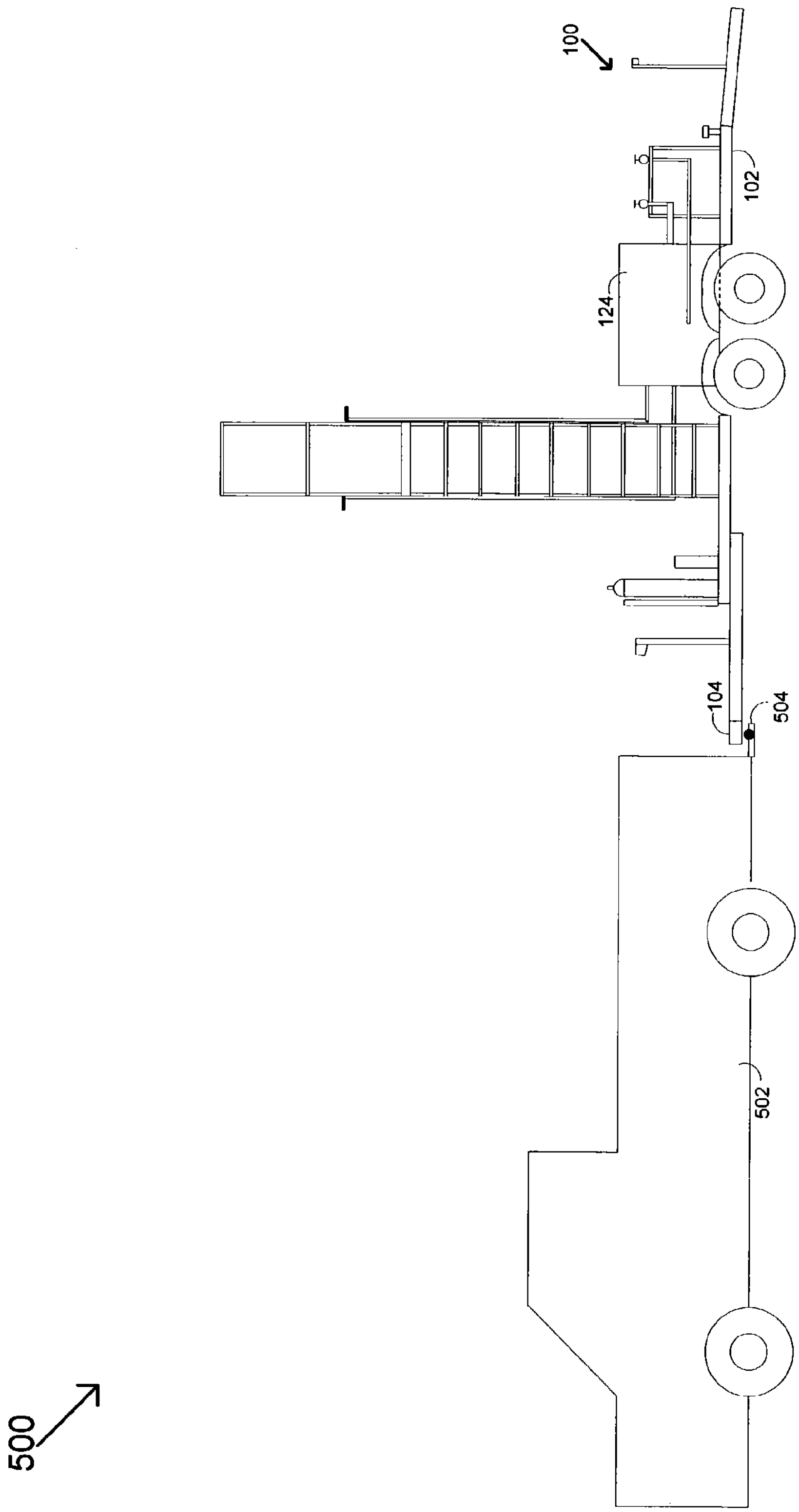
FIG. 5 depicts a side view of a method for transporting the portable material transfer unit to a material transfer site in accordance with an exemplary embodiment of the present invention.

FIG. 5 depicts a side view of a method for transporting the portable material transfer unit 100 to an unloading site in accordance with an exemplary embodiment of the present invention. The portable material transfer unit 100 is attached to a motorized vehicle 502 through the use of a tow ball 504 that is connected to the motorized vehicle 502 and a tow hitch 104 that is attached to the portable material transfer unit 100. Attaching the material transfer unit 100 to a motorized vehicle 502 allows the material transfer unit 100 to be moved from one rail tank car to another without the need to move the rail tank car. Furthermore, the mobility of the material transfer unit 100 allows for the unloading of material in areas that traditionally did not have tank car unloading services.

Figure 6:
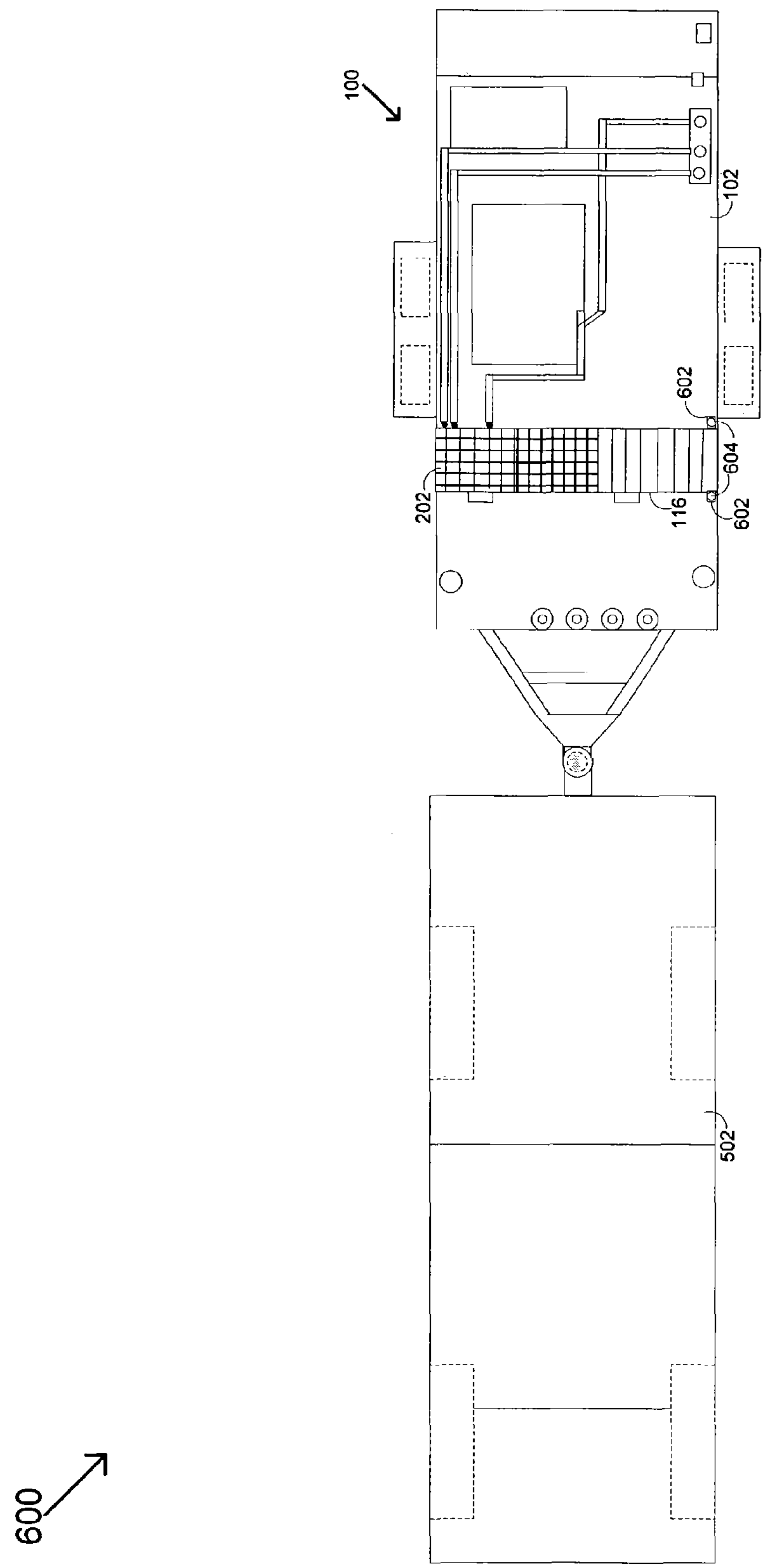
FIG. 6 depicts an overhead view of a method for transporting the portable material transfer unit to a material transfer site in accordance with an exemplary embodiment of the present invention.

FIG. 6 depicts an overhead view of a method for transporting the portable material transfer unit 100 to an unloading site in accordance with an exemplary embodiment of the present invention. Prior to transporting the material transfer unit 100 on a highway or public access road, the tank car access platform 116 can be lowered to its lowered position, as shown in FIG. 4A. Furthermore, the tank car access platform 116 can be slidably maneuvered into a transporting position on the material transfer unit 100, so that the entire tank car access platform 116, including the gangway 202, is within the perimeter of the mounting platform 102. The tank car access platform 116 can then be attached to the mounting platform 102 with multiple mounting plates 602 and fasteners 604.

In conclusion, the present invention comprises a completely self contained, highway accessible, portable, material transfer unit 100. The invention allows a user to take the material transfer unit 100 to any place accessible by a motorized vehicle, loosen the tank car access platform 116, slidably adjust the tank car access platform 116 to the edge of the mounting platform 102, fasten the tank car access platform 116 to the mounting platform 102, and unload a material from a first storage medium to another storage medium. The user can then move the material transfer unit 100 to the next storage medium without the need and expense of a locomotive, rail yard, or terminal. Prior to returning the material transfer unit 100 to the highway, a user need only slidably adjust the tank access platform 116 back to its transporting position and fasten the tank access platform 116 to the mounting platform 102.

It will be appreciated that the present invention fulfills the needs of the prior art described herein and meets the above-stated objectives. While there have been shown and described several exemplary embodiments of the present invention, it will be evident to those skilled in the art that various modifications and changes may be made thereto without departing from the spirit and the scope of the present invention as set forth in the appended claims and equivalence thereof.

What is claimed is:

1. A mobile material transfer unit comprising:

a mounting platform comprising a top side and a bottom side;

an axle attached to the mounting platform;

a plurality of wheels attached to the axle;

an access platform attached to the mounting platform, wherein the access platform comprises a stairway extending from said mounting platform and a landing platform extending from said stairway;

a compressor attached to the mounting platform for creating a pressure differential between a first storage medium and a second storage medium; and piping to facilitate the transfer of material between the first storage medium and the second storage medium.

2. The mobile material transfer unit of claim 1 further comprising:

a fuel tank attached to the mounting platform; and a tow hitch attached to the mounting platform.

3. The mobile material transfer unit of claim 2 further comprising a fuel line, wherein a first end of the fuel line is connected to the fuel tank and a second end of the fuel line is connected to the compressor, whereby the fuel line provides a path for fuel to flow from the fuel tank to the compressor.

4. The mobile material transfer unit of claim 2, wherein the tow hitch is capable of being attached to a hitch ball.

5. The mobile material transfer unit of claim 1, wherein the access platform further comprises;

an elongated access member attached to the mounting platform and extending from said mounting platform;

the stairway attached to the access member;

the landing platform attached to the access member; and a gangway attached to a first side of the landing platform.

6. The mobile material transfer unit of claim 1, wherein the compressor further comprises:

an engine for powering the compressor; and a clutch for transferring the power created by the engine to the compressor.

7. The mobile material transfer unit of claim 1, wherein the compressor is a liquefied petroleum gas vapor compressor.

8. The mobile material transfer unit of claim 1, wherein the piping to facilitate the transfer of pressurized liquid from the first storage medium to the second storage medium comprises:

a first set of piping connected to the compressor and capable of being connected to the first storage medium;

a second set of piping connected to the compressor and capable of being connected to the second storage medium;

a third and fourth set of piping capable of fluidly connecting the first storage medium to the second storage medium;

a plurality of valves capable of adjusting the flow of material and vapor through the first, second, third, and fourth sets of piping; and a plurality of piping connectors for attaching the first, second, third, and fourth sets of piping to the first and second storage mediums.

9. The mobile material transfer unit of claim 1, wherein the mounting platform comprises:

a first pair of elongated members;

a second pair of elongated members attached to the first pair of members to form a quadrilateral; and a cover plate attached to the first and second pair of elongated members.

10. The mobile material transfer unit of claim 9, wherein the cover plate comprises metal.

11. The mobile material transfer unit of claim 1, wherein the first storage medium comprises a rail tank car.

12. The mobile material transfer unit of claim 1, wherein the first storage medium comprises a tanker truck.

13. The mobile material transfer unit of claim 1, wherein the first storage medium comprises a storage tank.

14. The mobile material transfer unit of claim 1, wherein the second storage medium comprises a rail tank car.

15. The mobile material transfer unit of claim 1, wherein the second storage medium comprises a tanker truck.

16. The mobile material transfer unit of claim 1, wherein the second storage medium comprises a storage tank.

17. A method for unloading material at a plurality of remote locations comprising:

providing a first and a second location accessible by a first storage medium, wherein the first storage medium is mobile and can be maneuvered while comprising the material;

transporting a mobile material transfer unit to the first location and completing a first transfer operation of a first material from the first storage medium, wherein the first transfer operation comprises a compressor creating a pressure differential at the first storage medium and at a second storage medium and wherein the mobile material transfer unit comprises:

a mounting platform comprising a top side and a bottom side;

an axle attached to the mounting platform;

a plurality of wheels attached to the axle;

a telescoping access platform attached to the mounting platform and capable of being adjusted in the vertical direction;

a compressor attached to the mounting platform for creating a pressure differential between the first storage medium and a receiving storage medium; and piping to facilitate transfer of a pressurized material between the first storage medium and the receiving storage medium; and transporting the mobile material transfer unit to the second location and completing a second transfer operation of a second material from a second storage medium.

18. The method of claim 17, wherein the method of completing a transfer operation comprises:

placing the mobile material transfer unit near the first storage medium containing the first material; and unloading the first material from the first storage medium to a receiving storage medium by employing the mobile material transfer unit.

19. The method of claim 18, wherein the first storage medium comprises a rail tank car.

20. The method of claim 18, wherein the first storage medium comprises a storage tank.

21. The method of claim 18, wherein the first storage medium comprises a tanker truck.

22. The method of claim 18, wherein the receiving storage medium comprises a rail tank car.

23. The method of claim 18, wherein the receiving storage medium comprises a storage tank.

24. The method of claim 18, wherein the receiving storage medium comprises a tanker truck.

25. The method of claim 17, wherein the first material comprises a liquid.

26. The method of claim 17, wherein the first material comprises liquefied petroleum gas.

27. The method of claim 17, wherein transporting of the mobile material transfer unit is accomplished without disassembly of the mobile material transfer unit.

28. The method of claim 17, wherein the first and second location are the same.

29. The method of claim 17, wherein the first and second locations are separated by less than 10 miles.

30. The method of claim 17, wherein the first and second locations are separated by less than 300 miles.

31. The method of claim 17, wherein the first and second locations are separated by a distance greater than or equal to 300 miles.

32. The method of claim 17, wherein transporting the mobile material transfer unit comprises:

attaching the mobile material transfer unit to a motorized vehicle; and towing the mobile material transfer unit from a first location to a second location.

33. The method of claim 17, wherein the method of transporting the mobile material transfer unit comprises;

positioning an access platform in a transporting position;

securing the access platform to a mounting platform;

attaching the mobile material transfer unit to a motorized vehicle; and transporting the mobile material transfer unit with the motorized vehicle to the second location.

34. The method of claim 33, wherein the motorized vehicle comprises an automobile.

35. The method of claim 33, wherein the motorized vehicle comprises a truck.

36. The method of claim 17, wherein the first location comprises a storage terminal.

37. The method of claim 17, wherein the first location comprises a railroad yard.

38. The method of claim 17, wherein the first location comprises a railroad spur.

39. A mobile material transfer unit comprising:

a mounting platform comprising a top side and a bottom side;

an axle attached to the mounting platform;

a plurality of wheels attached to the axle;

a telescoping access platform attached to the mounting platform and capable of being adjusted in the vertical direction;

a compressor attached to the mounting platform for creating a pressure differential between a first storage medium and a second storage medium; and piping and hoses to facilitate transfer of a material between the first storage medium and the second storage medium.

40. The mobile material transfer unit of claim 39 further comprising a fuel tank attached to the mounting platform.

41. The mobile material transfer unit of claim 39 further comprising a tow hitch attached to the mobile material transfer unit.

42. The mobile material transfer unit of claim 41, wherein the tow hitch is capable of being attached to a hitch ball.

43. The mobile material transfer unit of claim 39, wherein the telescoping access platform comprises;

an elongated access member attached to the mounting platform;

a stairway slidably attached to the mounting platform;

a landing platform attached to the access member;

a gangway attached to a first side of the landing platform; and a lift for raising and lowering the gangway and landing platform.

44. The telescoping access platform of claim 43, wherein the lift is a pneumatic lift.

45. The telescoping access platform of claim 43, wherein the lift is a hydraulic lift.

46. The telescoping access platform of claim 43, wherein the lift is a mechanical lift.

47. The mobile material transfer unit of claim 39, wherein the compressor further comprises:

an engine for powering the compressor; and a clutch for transferring the power created by the engine to drive the compressor.

48. The mobile material transfer unit of claim 47, wherein the compressor is a liquefied petroleum gas vapor compressor.

49. The mobile material transfer unit of claim 39, wherein the mounting platform comprises:

a first pair of elongated members;

a second pair of elongated members attached to the first pair of elongated members to form a quadrilateral; and a cover plate attached to the first and second pair of elongated members.

50. A method for transferring material from a first storage medium comprising:

moving a mobile material transfer unit to a location where the unit is capable of being coupled to the first storage medium containing the material;

creating a pressure differential with a combustible fuel powered compressor positioned on the mobile material transfer unit, wherein the pressure differential is created by increasing the pressure at the first storage medium and decreasing the pressure at a second storage medium by drawing vapor from the second storage medium, passing the vapor through the compressor and into the first storage medium;

transferring the material through piping and hoses with the mobile material transfer unit; and moving the mobile material transfer unit away from the storage medium.

51. The method of claim 50, wherein moving the mobile material transfer unit comprises towing the material transfer unit over a public road.

52. The method of claim 50, wherein moving the mobile material transfer unit comprises towing the material transfer unit over a public road with one of an automobile and a truck.

53. The method of claim 50, wherein the material comprises a liquid.

54. The method of claim 50, wherein the material comprises liquefied petroleum gas.

55. The method of claim 50 further comprising the step of moving the mobile material transfer unit to a second location where the unit is capable of being coupled to a third storage medium containing a second material.

56. The method of claim 55, wherein the second material and the material are the same.

57. The method of claim 55, wherein the distance between the location and the second location is less than one mile.

58. The method of claim 55, wherein the distance between the location and the second location is less than 50 miles.

59. The method of claim 55, wherein the distance between the location and the second location is greater than or equal to 50 miles.

60. The method of claim 50, wherein the first storage medium comprises a rail tank car.

61. The method of claim 50, wherein the first storage medium comprises a tanker truck.

62. The method of claim 50, wherein the first storage medium comprises a storage tank.

63. The mobile material transfer unit of claim 1, wherein the stairway is capable of being adjusted in the vertical direction.

64. The mobile material transfer unit of claim 1, wherein the stairway is slidably attached to the mounting platform.

65. The mobile material transfer unit of claim 39, wherein the piping to facilitate the transfer of the material comprises a first set of piping connected to the compressor and capable of being connected to the first storage medium;

a second set of piping connected to the compressor and capable of being connected to the second storage medium;

a third and fourth set of piping capable of fluidly connecting the first storage medium to the second storage medium;

a plurality of valves capable of adjusting the flow of material and vapor through the first, second, third, and fourth sets of piping, and a plurality of piping connectors for attaching the first, second, third, and fourth sets of piping to the first and second storage mediums.

66. The mobile material transfer unit of claim 39, wherein the first storage medium comprises a rail tank car.

67. The mobile material transfer unit of claim 39, wherein the second storage medium comprises a tanker truck.

68. The mobile material transfer unit of claim 39, wherein the first storage medium comprises storage tank.

69. The mobile material transfer unit of claim 39, wherein the second storage medium comprises a rail tank car.

70. The mobile material transfer unit of claim 40, further comprising a fuel line, wherein a first end of the fuel line is connected to the fuel tank and a second end of the fuel line is connected to the compressor, whereby the fuel line provides a path for fuel to flow from the fuel tank to the compressor.

* * * * *